US012433241B2

(12) United States Patent
Mo et al.

(10) Patent No.: US 12,433,241 B2
(45) Date of Patent: Oct. 7, 2025

(54) DEVICE FOR LIVE ANIMAL TRANSPORT

(71) Applicant: The Boeing Company, Arlington, VA (US)

(72) Inventors: Jiao Mo, Shanghai (CN); Ke Ma, Shanghai (CN); Paola Trapani, Shanghai (CN); Saverio Silli, Shanghai (CN); Yiwei Liu, Shanghai (CN); Jialin Yuan, Shanghai (CN); Yuchen Tan, Shanghai (CN); Jiyu Song, Shanghai (CN); Kudilaiti Kuerban, Shanghai (CN); Peizhong Gao, Shanghai (CN); Long Long, Beijing (CN); Cynthia A. Vandewall, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/676,906

(22) Filed: May 29, 2024

(65) Prior Publication Data
US 2024/0415089 A1 Dec. 19, 2024

(30) Foreign Application Priority Data

Jun. 15, 2023 (CN) .......................... 202310716152.0

(51) Int. Cl.
A01K 1/02 (2006.01)
(52) U.S. Cl.
CPC .................. A01K 1/0272 (2013.01)
(58) Field of Classification Search
CPC ...... A01K 1/0272; A01K 1/0035; A01K 1/01; A01K 1/0236; A01K 1/0245; A01K 1/03; A01K 1/031
See application file for complete search history.

(56) References Cited

U.S. PATENT DOCUMENTS 142,069 A * 8/1873 Yeiser .................... A01K 1/033
119/482
1,751,834 A * 3/1930 Miller .................. A01K 1/0218
52/69

(Continued)

FOREIGN PATENT DOCUMENTS

CA 2762293 A1 12/2011
CN 107856596 A 3/2018
(Continued)

OTHER PUBLICATIONS

Translation of CN 115462319 (Year: 2022).*
European Patent Office, Extended European Search Report, App. No. 24180825.2 (Nov. 11, 2024).

Primary Examiner — William L Gmoser
(74) Attorney, Agent, or Firm — Walters & Wasylyna LLC

(57) ABSTRACT

The present disclosure relates to a device for live animal transport, comprising: a bottom plate, comprising a liquid guide plate and a non-liquid guide plate, wherein the liquid guide plate has a first end and a second end opposite the first end; a plurality of support members, symmetrically provided at predetermined intervals on the bottom plate at the first end and the second end of the liquid guide plate, and extending in a first direction perpendicular to the bottom plate; a plurality of pillars, one end of each pillar being nested in a corresponding one support member, and the plurality of pillars being capable of telescoping in the first direction; a plurality of beams, extending in a second direction from the first end of the liquid guide plate to the second end of the liquid guide plate, each beam being supported by the other end of the pillar at the first end of the liquid guide plate and the other end of the pillar at the second end of the liquid guide plate; side plates, provided on the bottom plate and extending in the first direction around edges of the bottom (Continued)

plate; and a top portion, supported by the plurality of beams to cover an interior space formed by the bottom plate and the side plates, wherein the plurality of pillars are configured to telescope in the first direction so as to adjust a contour of the top portion

13 Claims, 13 Drawing Sheets

(56) References Cited

U.S. PATENT DOCUMENTS

| | | | | |
|---|---|---|---|---|
| 2,422,438 | A * | 6/1947 | Richards | A01K 1/0245 |
| | | | | 119/490 |
| 3,256,858 | A * | 6/1966 | Pals | A01K 1/0035 |
| | | | | 119/512 |
| 3,662,712 | A * | 5/1972 | Singer | A01K 1/0272 |
| | | | | 119/453 |
| 3,727,581 | A | 4/1973 | Brent | |
| 4,102,307 | A * | 7/1978 | Cusick | A01K 1/0035 |
| | | | | 119/519 |
| 4,566,404 | A | 1/1986 | Instone et al. | |
| 5,524,573 | A * | 6/1996 | Hart | A01K 1/0245 |
| | | | | D30/108 |
| 5,655,484 | A * | 8/1997 | Aaberg | A01K 1/0236 |
| | | | | 119/751 |
| 5,950,565 | A * | 9/1999 | Guyot | A01K 1/0035 |
| | | | | 119/527 |
| 6,543,387 | B1 * | 4/2003 | Stein | A01K 1/0245 |
| | | | | 119/419 |
| 7,246,572 | B1 * | 7/2007 | Wade | A01K 1/0613 |
| | | | | 119/455 |
| 8,642,262 | B2 * | 2/2014 | Stroman | G06Q 30/0203 |
| | | | | 435/7.1 |
| 10,293,736 | B2 | 5/2019 | Nisbet et al. | |
| 10,842,126 | B1 * | 11/2020 | Volin | A01K 1/0353 |
| 11,690,354 | B2 * | 7/2023 | Kittridge | A01K 1/0281 |
| | | | | 119/496 |
| 2006/0185614 | A1 * | 8/2006 | Van Fleet | A01K 1/0245 |
| | | | | 119/496 |
| 2019/0202564 | A1 * | 7/2019 | Jung | B64D 11/003 |
| 2021/0337771 | A1 * | 11/2021 | Greive | A01K 1/105 |

FOREIGN PATENT DOCUMENTS

| | | | | |
|---|---|---|---|---|
| CN | 115462319 A | * | 12/2022 | ........... A01K 1/0107 |
| EP | 2676894 A1 | | 12/2013 | |
| GB | 2178005 A | | 2/1987 | |

* cited by examiner

DEVICE FOR LIVE ANIMAL TRANSPORT

PRIORITY

This application claims priority from Chinese Pat. App. No. 2023107161520 filed on Jun. 15, 2023, the entire contents of which are incorporated herein by reference.

FIELD

The present disclosure relates to the field of transportation, and in particular, to a device for live animal transport

BACKGROUND

Live animals, especially horses, are high-value and high-insurance animals, and are often transported by using cargo aircrafts. In addition to the horses themselves, for example, horse caretakers also travel along with the horses to ensure the comfort and wellness of the horses.

In addition to aircrafts, during transportation such as land transportation, there are several dense interactions regarding live animals, for example, transfer of horses to stalls, loading and unloading, take-off and landing, and non-negligible waiting time. During transportation, particularly during long-range flight, horse urine and feces are inevitable and are accumulated to a large amount, which causes damage of ammonia to the respiratory system of the horses to a certain extent, and produces symptoms of fever and respiratory diseases. Ammonia is considered as one of the causes of pneumonia and shipping fever of horses. Environmental conditions inside a stall are also important factors affecting the health of horses.

Nowadays, during horse transportation, for specific cargo positions, horse transport devices (e.g., stalls) of specific top contours are needed to adapt to different cargo hold positions. However, the price of a stall used in transportation is usually very expensive, and a huge investment is required to install a large number of stalls with a plurality of models, resulting in an increase in transportation costs.

In addition, information of horse transportation is in analogue, and these information comprises an air freight list, a check list, an e-mail and check of an accompanying horse caretaker/veterinarian, but lacks individual physiological characteristic data of each horse and a medium for basic data transmission. In particular, it is difficult to check and track the condition of each horse during mass transportation, and it is difficult to find the cause and liability of death/illness of a horse.

In view of this, it is desirable to provide a device for live animal transport, which can solve the described technical problem.

SUMMARY

Disclosed are devices for live animal transport.

In one example, the disclosed device for live animal transport includes a bottom plate, comprising a liquid guide plates and a non-liquid guide plate, wherein the liquid guide plate has a first end and a second end opposite the first end, and the non-liquid guide plate extends transversely at the first end of the liquid guide plates in a direction perpendicular to the liquid guide plate and is spaced apart from the liquid guide plate; a plurality of support members, symmetrically provided at predetermined intervals on the bottom plate at the first end of the liquid guide plate and on the bottom plate at the second end of the liquid guide plate, and extending in a first direction perpendicular to the bottom plate; a plurality of pillars, one end of each pillar being nested in a corresponding one support member, and the plurality of pillars being configured to be capable of telescoping in the first direction; a plurality of beams, extending in a second direction from the first end of the liquid guide plate to the second end of the liquid guide plate, each beam being supported by the other end of the pillar at the first end of the liquid guide plate and the other end of the pillar at the second end of the liquid guide plate; side plates, provided on the bottom plate and extending in the first direction around edges of the bottom plate; and a top portion, supported by the plurality of beams to cover an interior space formed by the bottom plate and the side plates, wherein the interior space is used to accommodate the live animal, and wherein the plurality of pillars are configured to telescope in the first direction so as to adjust a contour of the top portion.

Other examples of the disclosed devices for live animal transport will become apparent from the following detailed description, the accompanying drawings, and the appended claims.

BRIEF DESCRIPTION OF THE DRAWINGS

The drawings illustrated herein are used for providing further understanding of the present disclosure and constitute a part of the present disclosure, and the illustrative embodiments of the present disclosure and illustrations thereof are used for explaining the present disclosure, rather than constituting inappropriate limitation on the present disclosure. In the drawings.

DETAILED DESCRIPTION

Figure 1:
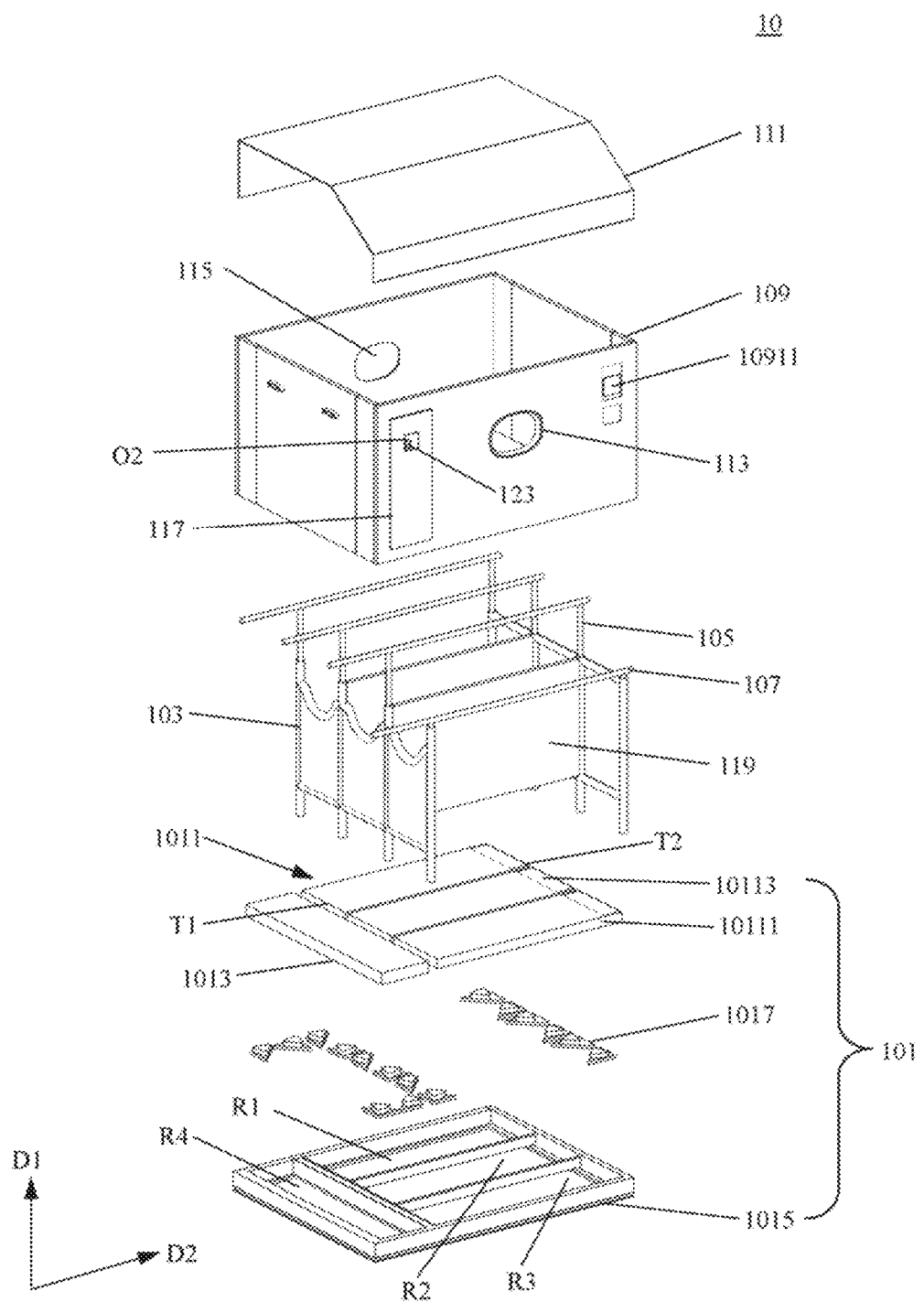
FIG. 1 shows an exploded perspective view of a device for live animal transport according to embodiments of the present disclosure.

The present disclosure provides a device for live animal transport, which can adjust the contour of the top portion of the device by a plurality of telescopic pillars, so as to adapt to different cargo hold positions, thereby reducing the transportation costs of live animals. In addition, the device also has the functions of guiding and absorbing liquid excreted from live animals, thereby preventing the liquid from damaging the health of the live animals. Moreover, the device can monitor physiological characteristics of live animals and environmental conditions in real time, and convey the data information to live animal caretakers, so as to help the caretakers to take measures in time to improve environmental factors, thereby improving the comfort and living conditions of the live animals. Finally, by using the described data information, the cause and liability of death or illness of a live animal can be easily found. In conclusion, the device for live animal transport provided by the present disclosure can greatly reduce the transportation cost, guarantee the health and living condition of live animals, and facilitate monitoring and tracing of problems during transportation.

According to embodiments of the present disclosure, a device for live animal transport is provided, the device comprising: a bottom plate, comprising a liquid guide plate and a non-liquid guide plate, wherein the liquid guide plate has a first end and a second end opposite the first end, and the non-liquid guide plate extends transversely at the first end of the liquid guide plate in a direction perpendicular to the liquid guide plate and is spaced apart from the liquid guide plate; a plurality of support members, symmetrically provided at predetermined intervals on the bottom plate at the first end of the liquid guide plate and on the bottom plate at the second end of the liquid guide plate, and extending in a first direction perpendicular to the bottom plate; a plurality of pillars, one end of each pillar being nested in a corresponding one support member, and the plurality of pillars being configured to be capable of telescoping in the first direction; a plurality of beams, extending in a second direction from the first end of the liquid guide plates to the second end of the liquid guide plates, each beam being supported by the other end of the pillar at the first end of the liquid guide plate and the other end of the pillar at the second end of the liquid guide plate; side plates, provided on the bottom plate and extending in the first direction around edges of the bottom plate; and a top portion, supported by the plurality of beams to cover an interior space formed by the bottom plate and the side plates, wherein the interior space is used to accommodate the live animal, and wherein the plurality of pillars are configured to telescope in the first direction so as to adjust a contour of the top portion.

By providing the plurality of pillars capable of telescoping in the first direction, the contour of the top portion of the device can be adjusted, such that the device for live animal transport can adapt to different cargo hold positions, and thus there is no need to customize devices for live animal transport with different top contours regarding different cargo hold positions, thereby reducing the transportation costs of live animals.

In embodiments according to the present disclosure, the liquid guide plate comprises a plurality of liquid guide members and a plurality of liquid absorption members, wherein the plurality of liquid guide members are arranged side by side along the second direction, each liquid absorption member is provided at the end of each liquid guide member at the second end of the liquid guide plate, the plurality of liquid guide members are configured to guide liquid excreted from the live animal, and the plurality of liquid absorption members are configured to absorb the liquid guided by the corresponding liquid guide members.

The liquid excreted from the live animal is guided to the liquid absorption members by the liquid guide members, so that the liquid can be collected, thereby preventing the liquid from flowing transversely on the inner bottom plate of the device for live animal transport, which affects the health of the live animal, while improving the comfort of the inner environment of the device.

In embodiments according to the present disclosure, the bottom plate further comprises: a base, provided with recesses, wherein the liquid guide plate and the non-liquid guide plate can be snap-fitted in the recesses.

By means of the snap-fit between the recesses on the base and the liquid guide plate and the non-liquid guide plate, slippage of the liquid guide plate and the non-liquid guide plate caused by the live animal moving on the bottom plate is avoided, thereby improving the safety of the live animal.

In embodiments according to the present disclosure, the bottom plate has: a first side; a second side, opposite the first side; a third side, adjacent to the first side; and a fourth side, opposite the third side; and the side plates comprise: a first side plate, provided on the first side of the bottom plate; a second side plate, provided on the second side of the bottom plate; a third side plate, provided on the third side of the bottom plate; and a fourth side plate, provided on the fourth side of the bottom plate, wherein the device for live animal transport further comprises: a first inspection window, provided at a middle portion of the first side plate; a second inspection window, provided at a middle portion of the second side plate; and a door, provided at the end of the first side plate adjacent to the fourth side plate, wherein a caretaker of the live animal touches and inspects the live animal accommodated in the interior space through the first inspection window and/or the second inspection window, and the caretaker of the live animal can enter the interior space through the door.

By providing open inspection windows on the outer walls of the side plates, the caretaker of the live animal can touch and inspect the abdomen and surrounding tissues of the live animal when outside the device for live animal transport, so as to diagnose whether the live animal suffers from common high-risk symptoms such as abdominal angina and bloating. In addition, by providing the door, the caretaker of the live animal can enter the interior of the device for live animal transport to inspect and take care of the live animal. Thereby, convenience is brought about for the work of the caretaker of the live animal.

In embodiments according to the present disclosure, the device for live animal transport further comprises: a first digital system, configured to acquire physiological characteristic data of the live animal and send the acquired physiological characteristic data to the outside by a wireless transmission manner.

By acquiring the physiological characteristic data of the live animal by the first digital system, the caretaker of the live animal can know the physiological condition of each live animal in time, thereby providing more timely and appropriate care for the live animal.

In embodiments according to the present disclosure, the first digital system comprises: a pulse sensor, configured to sense the pulse of the live animal to obtain pulse data of the live animal; a respiratory rate sensor, configured to sense the respiratory rate of the live animal to obtain respiratory rate data of the live animal; a temperature sensor, configured to sense the body temperature of the live animal to obtain temperature data of the live animal; a GPS sensor, configured to position the position of the live animal to obtain position data of the live animal; an RFID tag, configured to record identity identification information of the live animal; and a solar cell, configured to supply power to the pulse sensor, the respiratory rate sensor, the temperature sensor and the GPS sensor, wherein the physiological characteristic data comprises the pulse data, the respiratory rate data and the temperature data, and the physiological characteristic data, the identity identification information and the position data of the live animal are sent to the outside in a correlated manner by a wireless transmission manner.

By the described manner, a specific configuration form of the first digital system is provided.

In embodiments according to the present disclosure, the first digital system is integrated in straps or belts worn on the body of the live animal.

By the described manner, physiological characteristic data of each live animal can be conveniently monitored.

In embodiments according to the present disclosure, the device for live animal transport further comprises: a second digital system, configured to: sense first data characterizing environmental conditions in the interior space; receive the physiological characteristic data, the identity identification information and the position data of the live animal from the first digital system; analyze the first data and the physiological characteristic data, to obtain an analysis result; and display the analysis result.

By the second digital system, the physiological characteristic data of each live animal and the environmental condition information inside the device for live animal transport can be acquired, so that the caretaker of the live animal can know the physical condition and the living environment of the live animal in time, thereby providing more comfortable care for the live animal.

In embodiments according to the present disclosure, the second digital system comprises: a control portion, having a front face and a back face, a plurality of serial interfaces being provided on the back face; a gas sensor, in communication connection with the control portion via the serial interfaces, and configured to sense the contents of predetermined gases in the interior space to obtain gas content data and to transmit the gas content data to the control portion via the serial interfaces; an environmental sensor, in communication connection with the control portion via the serial interfaces, and configured to sense environmental data in the interior space and to transmit the environmental data to the control portion via the serial interfaces; a dust sensor, in communication connection with the control portion via the serial interfaces, and configured to sense the concentration of dust in the interior space to obtain dust concentration data and to transmit the dust concentration data to the control portion via the serial interfaces; a wireless communication portion, provided on the back face of the control portion, the control portion receiving the physiological characteristic data, the identity identification information and the position data of the live animal from the first digital system via the wireless communication portion; a processor, provided on the back face of the control portion, the processor comprising a GPU chip, wherein the GPU chip can process multi-modal data comprising the gas content data, the environmental data, the dust concentration data and the physiological characteristic data which are received in real time, and can predict the health state and the risk of illness of the live animal by a prediction model according to the processed multi-modal data; and a display portion, provided on the front face of the control portion, wherein the display portion has a visual interface, the visual interface visually presents the processed multi-modal data and the risk of illness information of the live animal, and supports screen-based touch interaction of a user for the user to select and view desired data, wherein the first data comprises the gas content data, the environmental data and the dust concentration data.

By the described manner, a specific configuration form of the second digital system is provided.

In embodiments according to the present disclosure, the second digital system further comprises: a support portion, configured to support the control portion, the gas sensor, the environmental sensor, the dust sensor, the wireless communication portion, the processor, and the display portion; and a housing, configured to accommodate the support portion, wherein the housing comprises: a first housing, provided with a plurality of air holes penetrating through the first housing in a predetermined area, the first housing accommodating the support portion from one side of the support portion; and a second housing, arranged opposite the first housing and having a housing opening of the same size as the display portion, wherein the second housing accommodates the support portion from the other side of the support portion opposite the one side, and when the support portion is accommodated in the housing, the display portion is embedded in the housing opening.

By the described manner, according to actual situations, the second digital system can be embedded as an independent component in other components for use, thereby making the use of the second digital system more flexible.

In embodiments according to the present disclosure, the second digital system further comprises: a vacuum pump, provided in the housing and supported by the support portion, the vacuum pump being configured to enable air inside the housing to communicate with air in the interior space outside the housing.

Air is circulated by the vacuum pump, so that the air inside the housing is consistent with the air inside the interior space outside the housing as much as possible, and air parameters measured inside the housing can reflect the air condition inside the interior space outside the housing as accurately as possible, thereby improving the accuracy of data sensed by the sensors in the second digital system.

In embodiments according to the present disclosure, the door is provided with a door opening, and the second digital system can be embedded in the door opening, so that the display portion is provided toward the outside of the door via the door opening.

By the described manner, an arrangement of the second digital system on the door of the device for live animal transport is provided.

In embodiments according to the present disclosure, the device for live animal transport further comprises: live animal partition plates, provided in the interior space and configured to partition, according to the number of the plurality of liquid guide members, the interior space into a plurality of predetermined spaces corresponding to said number, each predetermined space being capable of accommodating one live animal, wherein in each predetermined space, one liquid guide member and one liquid absorption member are provided.

By providing the live animal partition plates, each live animal is located in a relatively independent space, thereby improving the comfort of the live animal.

In order to enable a person skilled in the art to understand the solutions of the present disclosure better, hereinafter, the technical solutions in the embodiments of the present disclosure will be described clearly and thoroughly with reference to the accompanying drawings in embodiments of the present disclosure. Obviously, the embodiments as described are only some of embodiments of the present disclosure, and are not all the embodiments. On the basis of the embodiments in the present disclosure, all other embodiments obtained by a person of ordinary skill in the art without any inventive effort shall all fall within the scope of protection of the present disclosure.

According to the embodiments of the present disclosure, a device for live animal transport is provided. FIG. 1 shows an exploded perspective view of a device for live animal transport according to embodiments of the present disclosure.

As shown in FIG. 1, the device 10 for live animal transport may comprise a bottom plate 101, a plurality of support members 103, a plurality of pillars 105, a plurality of beams 107, side plates 109, and a top portion 111.

The bottom plate 101 comprises a liquid guide plate 1011 and a non-liquid guide plate 1013. The liquid guide plate 1011 has a first end T1 and a second end T2 opposite the first end T1. The non-liquid guide plate 1013 extends transversely at the first end T1 of the liquid guide plate 1011 in a direction perpendicular to the liquid guide plates 1011, and is spaced apart from the liquid guide plate 1011. The non-liquid guide plate 1013 will serve as a floor for a live animal caretaker to walk.

The plurality of support members 103 are symmetrically arranged at predetermined intervals on the bottom plate 101 at the first end T1 of the liquid guide plate 1011 and on the bottom plate 101 at the second end T2 of the liquid guide plate 1011, and extend in a first direction D1 perpendicular to the bottom plate 101.

Specifically, FIG. 1 shows eight support members 103, wherein at the first end T1 of the liquid guide plate 1011, four support members 103 are arranged on the bottom plate 101 at predetermined intervals and extend in the first direction D1. At the second end T2 of the liquid guide plate 1011, four support members 103 are arranged on the bottom plate 101 at predetermined intervals and extend in the first direction D1. The four support members 103 arranged at the first end T1 of the liquid guide plate 1011 and the four support members 103 arranged at the second end T2 of the liquid guide plate 1011 are symmetrically arranged in the lengthwise direction of the liquid guide plates 1011. According to the embodiments of the present disclosure, the support members 103 have hollow structures.

One end of each of the plurality of pillars 105 is nested in a corresponding one support member 103, and is configured to be capable of telescoping in the first direction D1. Specifically, FIG. 1 shows eight pillars 105, in which the eight pillars each have one end nested in a corresponding support member among the eight support members 103, and the pillars 105 can telescope relative to the support members 103 in the first direction D1 in a manner of hydraulic rods or pneumatic rods, so as to change the lengths of the pillars 105 exposed out of the support members 103.

The plurality of beams 107 extend in a second direction D2 from the first end T1 of the liquid guide plate 1011 to the second end T2 of the liquid guide plate 1011, and each cross beam 107 is supported by the other end of the pillar 105 at the first end T1 of the liquid guide plate 1011 and the other end of the pillar 105 at the second end T2 of the liquid guide plate 1011.

Specifically, FIG. 1 shows four beams 107, in which the four beams are respectively supported by the other ends of the pillars 105 symmetrically arranged at the first end T1 of the liquid guide plate 1011 and the second end T2 of the liquid guide plate 1011. The four beams 107 extend along the second direction D2.

The side plates 109 are arranged on the bottom plate 101 and extend in the first direction D1 around edges of the bottom plate 101. The side plates 109 and the bottom plate 101 form an interior space of the device 10, the interior space being used to accommodate a live animal, e.g., a horse.

The top portion 111 is supported by the plurality of beams 107, to cover the interior space formed by the side plates 109 and the bottom plate 101. In the embodiments of the present disclosure, the top portion 111 may be a stretchable elastic fabric, but the present disclosure is not limited thereto.

In the embodiments of the present disclosure, the contour of the top portion 111 is adjusted by telescoping the plurality of pillars 105 in the first direction D1, so that the contour of the top portion 111 of the device 10 can adapt to different cargo hold positions.

Figure 2:
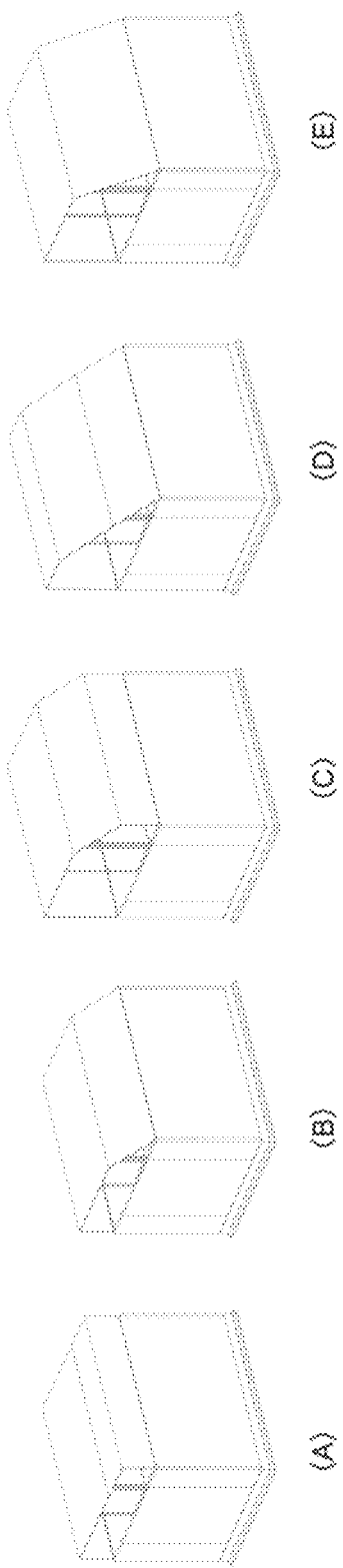
FIG. 2 shows diagrams of devices for live animal transport having changed top contours.

FIG. 2 shows diagrams of devices for live animal transport having changed top contours. FIG. 2 shows five devices (A), (B), (C), (D) and (E) for live animal transport, which are obtained by telescoping the pillars, have different top contours and can adapt to different cargo hold positions; and thus, there is no need to customize devices for live animal transport with different top contours regarding different cargo hold positions, thereby reducing the transportation costs of live animals.

Figure 3:
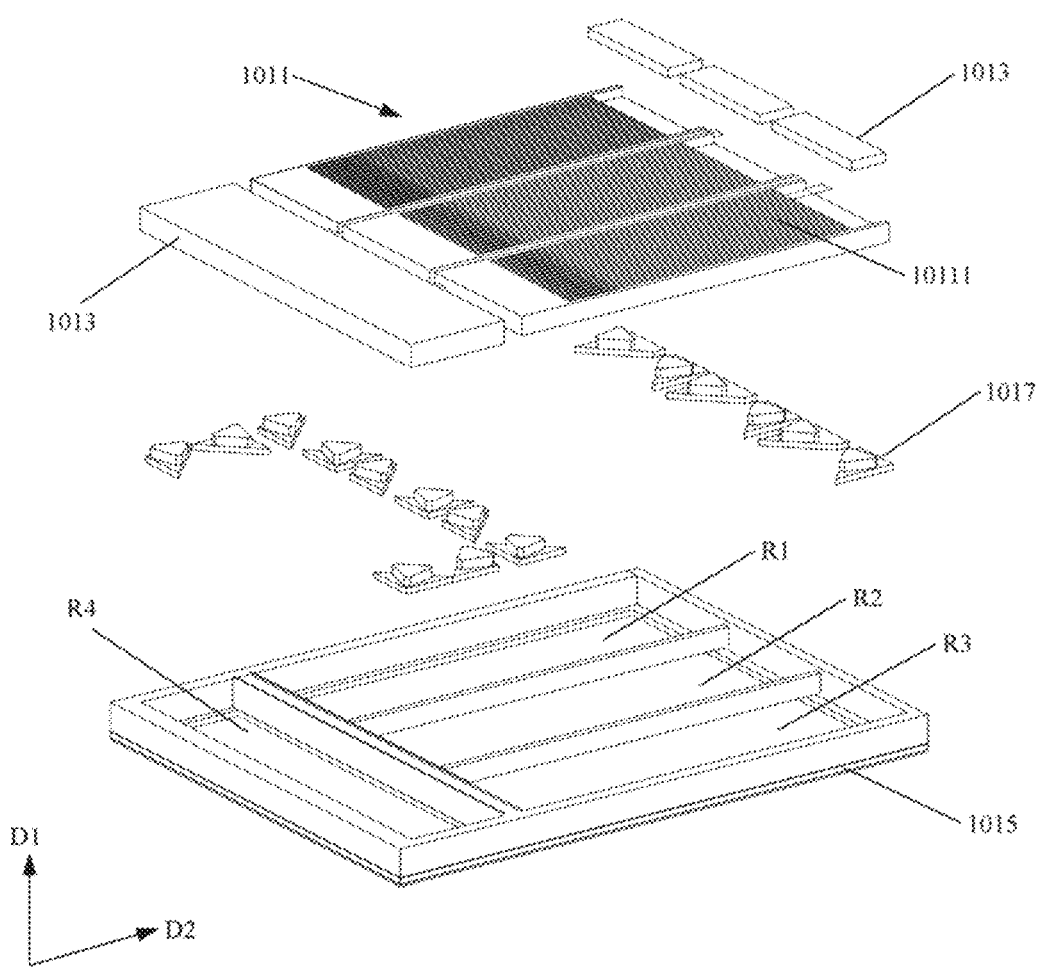
FIG. 3 shows an exploded perspective view of a base plate.
Figure 4:
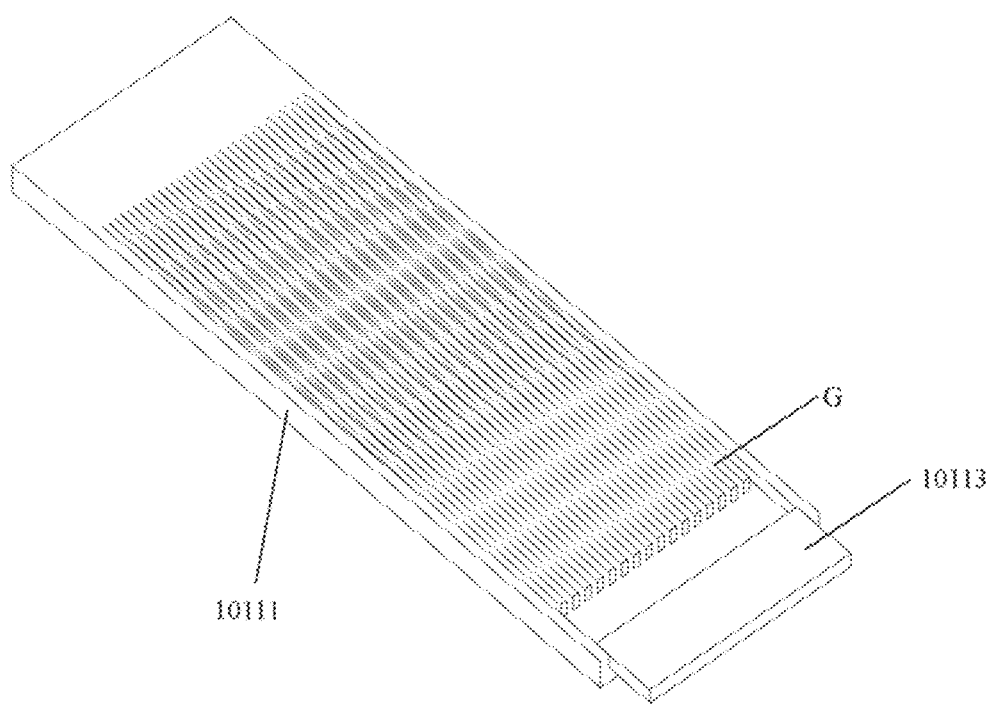
FIG. 4 shows a detailed structural diagram of a single liquid guide member.

FIG. 3 shows an exploded perspective view of a base plate; and FIG. 4 shows a detailed structural diagram of a single liquid guide member. Hereinafter, the specific configuration of the bottom plate 101 will be described in detail in conjunction with FIGS. 1, 3 and 4.

As shown in FIGS. 1 and 3, the bottom plate 101 can further comprise a base 1015; the base 1015 is provided with recesses corresponding to the liquid guide plate 1011 and the non-liquid guide plate 1013, and the liquid guide plate 1011 and the non-liquid guide plate 1013 can be snap-fitted in the recesses.

The liquid guide plate 1011 may comprise a plurality of liquid guide members 10111 and a plurality of liquid absorption members 10113. The plurality of liquid guide members 10111 are arranged side by side along the second direction D2, and each liquid absorption member 10113 is arranged at the end of each liquid guide member 10111 located at the second end T2 of the liquid guide plate 1011. The plurality of liquid guide members 10111 are configured to guide liquid excreted from the live animal, and the plurality of liquid absorption members 10113 are configured to absorb the liquid guided by the respective liquid guide members 10111.

As shown in FIG. 4, each liquid guide member 10111 has grooves G extending on the surface from one end to the other end of the liquid guide member 10111 along the lengthwise direction; the depth of each groove G gradually increases along the lengthwise direction of the liquid guide member 10111 from one end to the other end, and becomes the deepest until reaching the liquid absorption member 10113 provided at the other end of the liquid guide member 10111, so that the liquid excreted from the live animal can be smoothly guided to the liquid absorption member 10113, and is absorbed by the liquid absorption member 10113.

Specifically, FIG. 3 shows the liquid guide plate 1011 comprising three liquid guide members 10111 and three liquid absorption members 10113, and one non-liquid guide plate 1013 arranged at the first end T1 of the liquid guide plate 1011 and extending perpendicular to the liquid guide plate 1011; recesses R1-R4 respectively corresponding to the three liquid guide members 10111 and one non-liquid guide plate 1013 are provided in the base 1015, the three liquid guide members 10111 and one non-liquid guide plate 1013 can be snap-fitted in the corresponding recesses R1-R4, so as to prevent, when the live animal moves on the bottom plate 101, the slippage of the liquid guide plate 1011 and the non-liquid guide plate 1013 relative to the base 1015.

Further, damping components 1017 are provided between four corners of each liquid guide member 10111 and the base 1015 and between four corners of the non-liquid guide plate 1011 and the base 1015.

Figure 5:
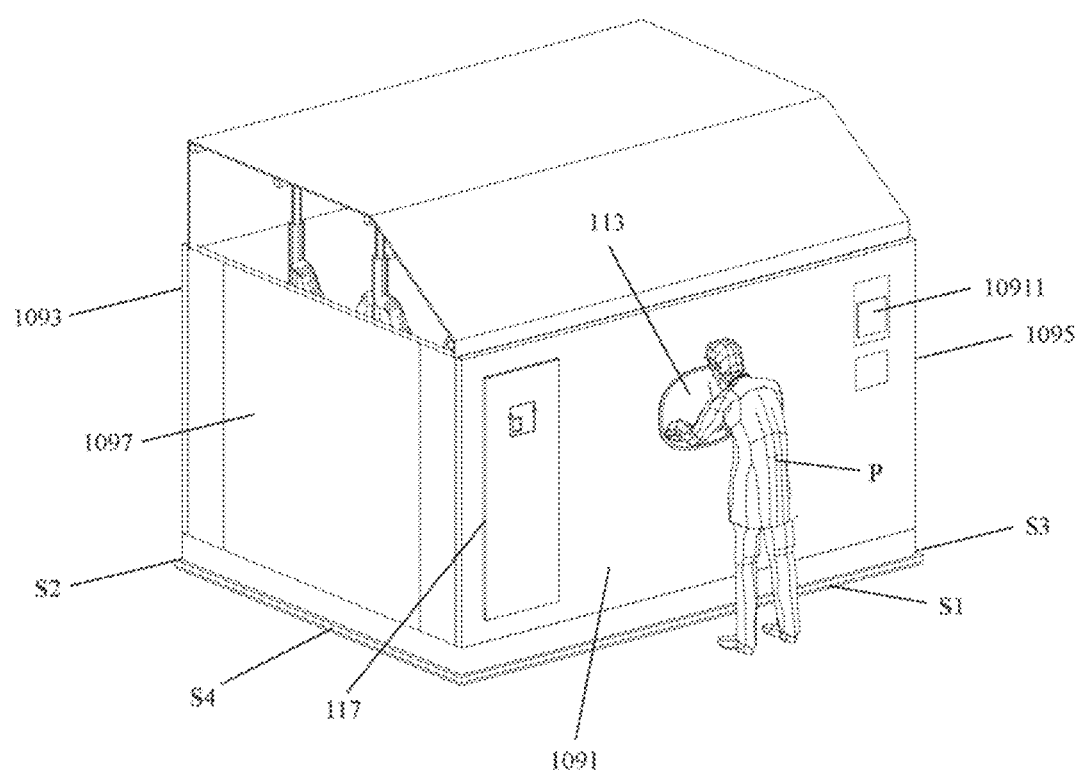
FIG. 5 shows an overall diagram of a device for live animal transport according to embodiments of the present disclosure.

FIG. 5 shows an overall diagram of a device for live animal transport according to embodiments of the present disclosure.

As shown in FIGS. 1 and 5, the bottom plate 101 has a first side S1, a second side S2 opposite the first side S1, a third side S3 adjacent to the first side S1, and a fourth side S4 opposite the third side S3. The side plates 109 comprise a first side plate 1091, a second side plate 1093, a third side plate 1095, and a fourth side plate 1097. The first side plate 1091 is arranged on the first side S1 of the bottom plate 101, the second side plate 1093 is arranged on the second side S2 of the bottom plate 101, the third side plate 1095 is arranged on the third side S3 of the bottom plate 101, and the fourth side plate 1097 is arranged on the fourth side S4 of the bottom plate 101. A first inspection window 113 is provided at a middle portion of the first side plate 1091, a second inspection window 115 is provided at a middle portion of the second side plate 1093, and a door 117 is provided at the end of the first side plate 1091 adjacent to the fourth side plate 1097.

As shown in FIG. 5, outside the device 10, a caretaker P of live animals can touch and inspect the live animal accommodated in the interior space of the device 10 through the first inspection window 113 and/or the second inspection window 115, without having to enter the interior space of the device 10. The caretaker P of live animals can also enter the interior space of the device 10 through the door 117, to take care of or inspect the live animal.

In the embodiments according to the present disclosure, the third side plate 1095 and the fourth side plate 1097 may be configured to be capable of opening outward in the D2 direction; and when a live animal is loaded with the device 10, the live animal may enter the interior space of the device 10 from the opened third side plate 1095, and when the live animal is unloaded from the device 10, the live animal may leave the device 10 from the opened fourth side plate 1097.

As shown in FIG. 1, the device 10 can also comprise live animal partition plates 119 which are provided in the interior space of the device 10 and configured to partition, according to the number of the liquid guide members 10111, the interior space into a plurality of predetermined spaces corresponding to said number, each predetermined space being capable of accommodating one live animal. For example, as shown in FIG. 1, the interior space is partitioned into three relatively independent spaces by two live animal partition plates 119, and in each of the three relatively independent spaces, one liquid guide member 10111 and one liquid absorption member 10113 are provided, and one independent space can accommodate one live animal.

The device 10 for live animal transport according to the embodiments of the present disclosure can further comprise a first digital system 121 (not shown in FIG. 1), the first digital system 121 being configured to acquire physiological characteristic data of the live animal and transmit the acquired physiological characteristic data to the outside by a wireless transmission manner.

Figure 6:
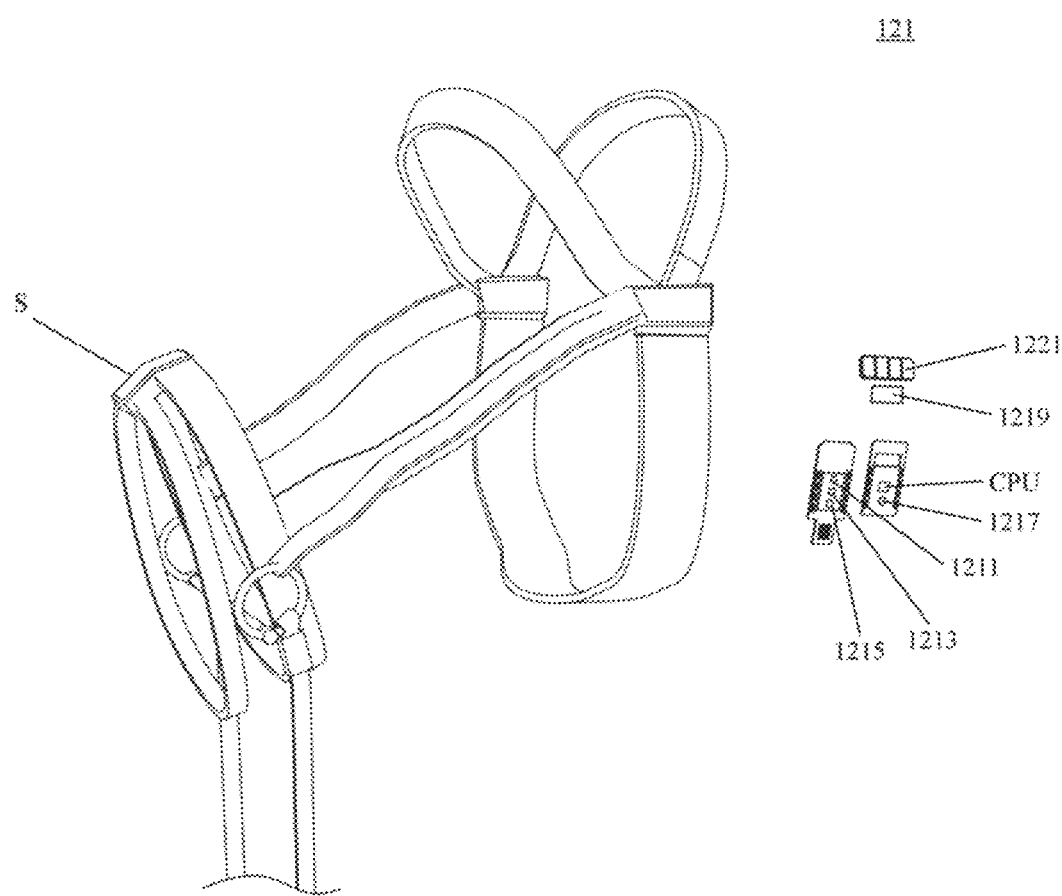
FIG. 6 shows a schematic diagram of a specific configuration of a first digital system.
Figure 7:
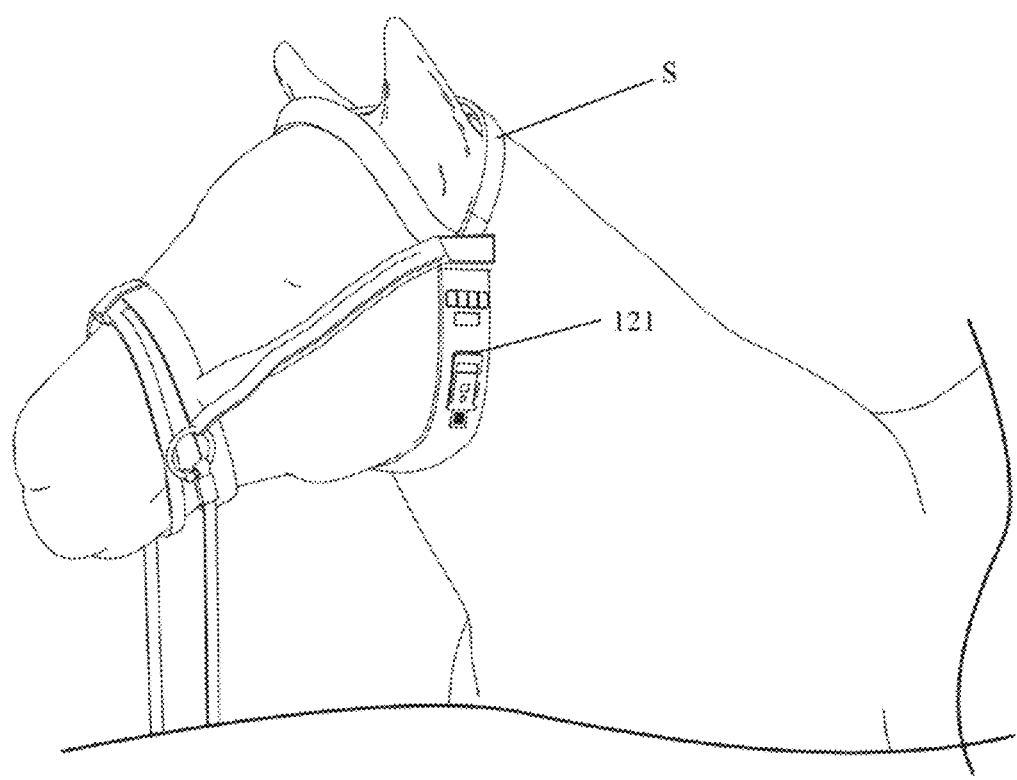
FIG. 7 shows a schematic diagram of a first digital system worn on the body of a live animal.

FIG. 6 shows a schematic diagram of a specific configuration of a first digital system; and FIG. 7 shows a schematic diagram of a first digital system worn on the body of a live animal. Hereinafter, the first digital system 121 is described in detail with reference to FIGS. 6 and 7.

As shown in FIG. 6, the first digital system 121 comprises a pulse sensor 1211, a respiratory rate sensor 1213, a temperature sensor 1215, a GPS sensor 1217, an RFID tag 1219, a solar cell 1221, and a CPU.

The pulse sensor 1211 is configured to sense the pulse of the live animal to obtain pulse data of the live animal; the respiratory rate sensor 1213 is configured to sense the respiratory rate of the live animal to obtain respiratory rate data of the live animal; the temperature sensor 1215 is configured to sense the body temperature of the live animal to obtain temperature data of the live animal; the GPS sensor 1217 is configured to position the position of the live animal to obtain position data of the live animal; the RFID tag 1219 is configured to record identity identification information of the live animal; the solar cell 1221 is configured to supply power for the pulse sensor 1211, the respiratory rate sensor 1213, the temperature sensor 1215 and the GPS sensor 1217; and the CPU controls the sensors as described above.

Here, the physiological characteristic data of the live animal may comprise the pulse data, the respiratory rate data and the temperature data described above. The identity identification information of the live animal may comprise information capable of identifying the identity of the live animal, such as breed, number and name of the live animal.

The physiological characteristic data, the identity identification information and the position data of the live animal may be sent to the outside in a correlated manner by a wireless transmission manner.

The left side of FIG. 6 shows straps S of a live animal, such as a horse, in which the first digital system 121 may be integrated in the straps S. As shown in FIG. 7, when the straps S are worn by a horse, the first digital system 121 can sense pulse data, respiratory rate data, temperature data and position data of the horse, and send these physiological characteristic data, and identity identification information and position data of the horse to the outside in a correlated manner by a wireless transmission manner.

Here, an example in which the first digital system 121 is integrated in the straps of a horse is shown, but the present disclosure is not limited thereto; and the first digital system 121 may also be integrated in belts, etc. worn on the body of a live animal.

The device 10 for live animal transport according to the embodiments of the present disclosure may further comprise a second digital system 123, the second digital system 123 being configured to: sense first data characterizing environmental conditions in the interior space of the device 10; receive the physiological characteristic data, the identity identification information and the position data of the live animal from the first digital system 121; analyze the first data and the physiological characteristic data, to obtain an analysis result; and display the analysis result.

Figure 8:
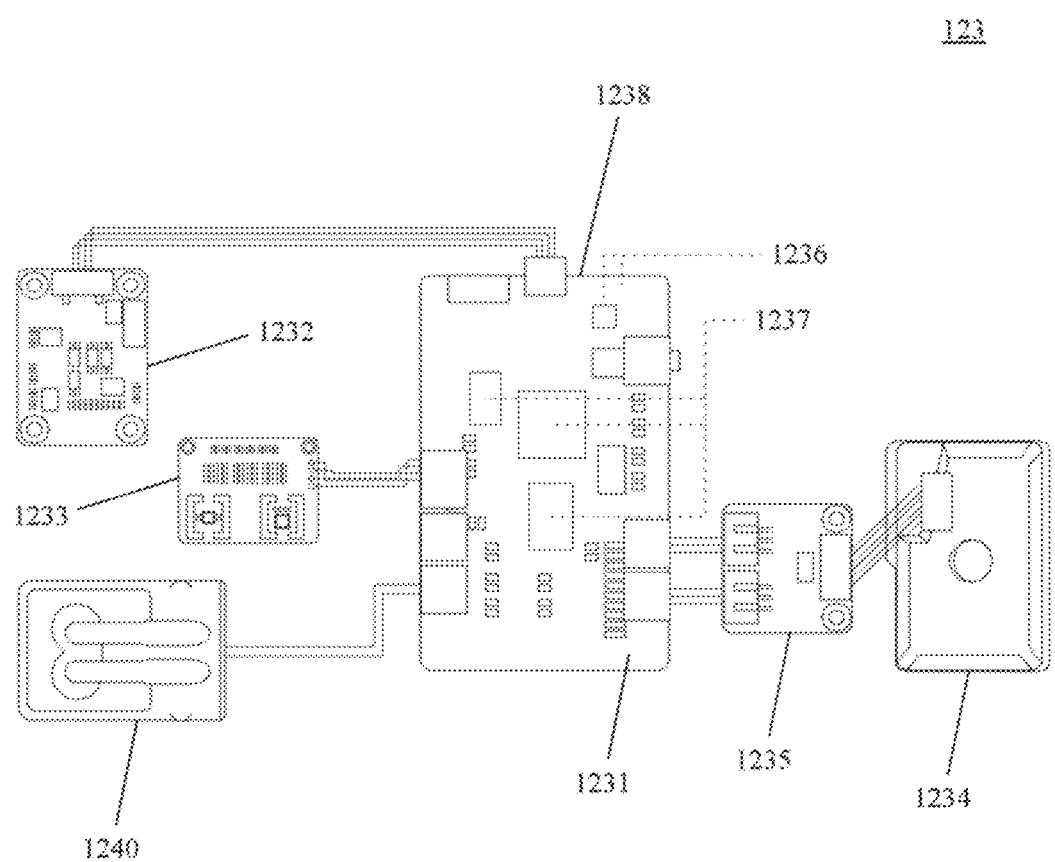
FIG. 8 is a schematic diagram of a local configuration of a second digital system.
Figure 9A:
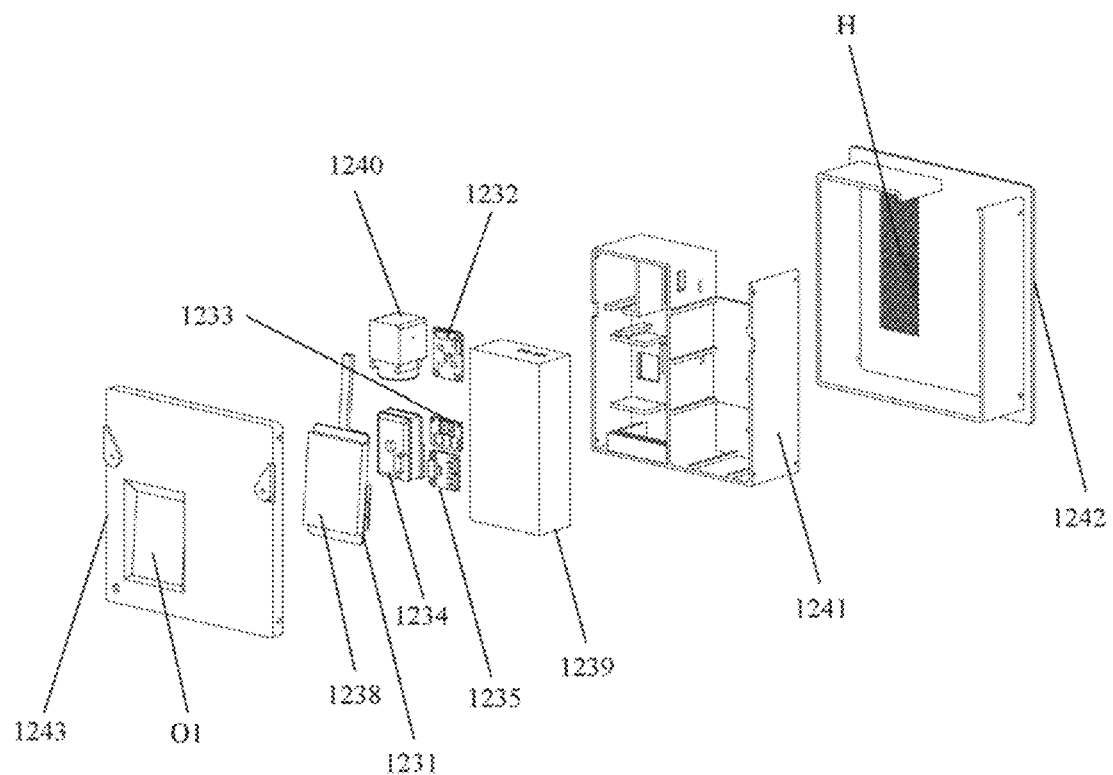
FIG. 9A shows an exploded perspective view of a second digital system.
Figure 9B:
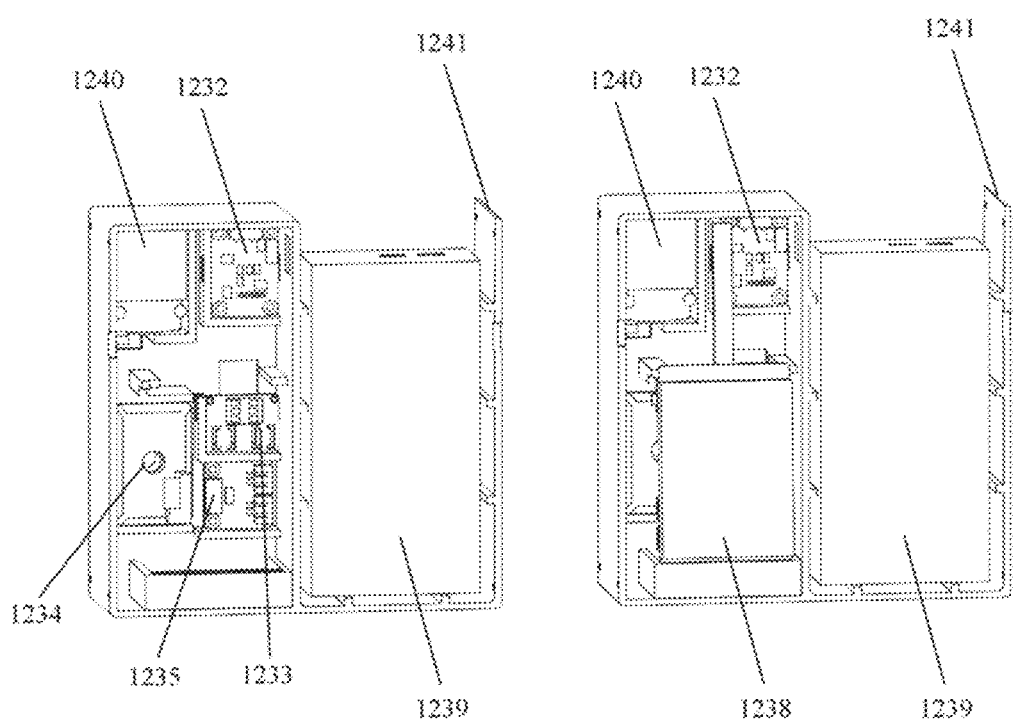
FIG. 9B shows a diagram of components inside a second digital system being combined together.
Figure 10:
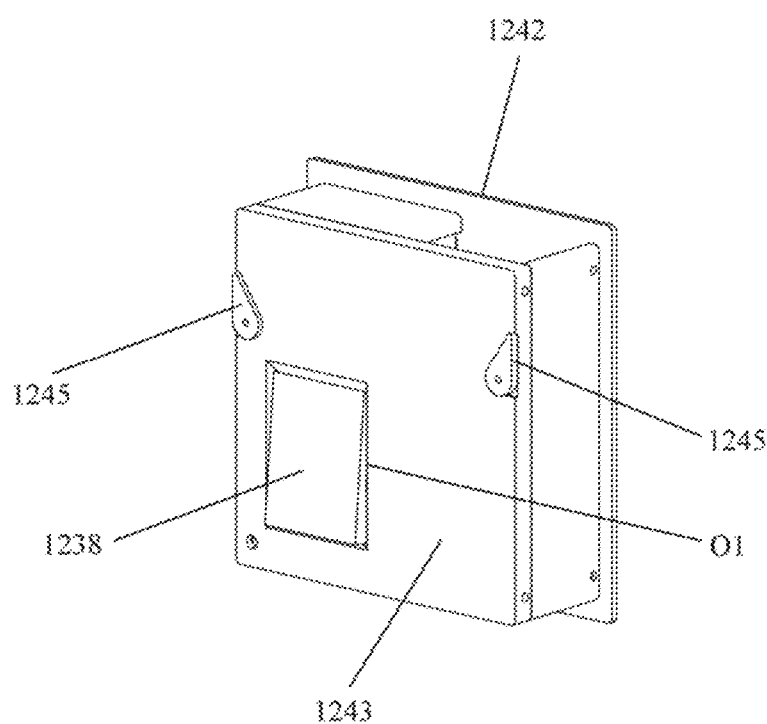
FIG. 10 shows an overall configuration diagram of a second digital system.

FIG. 8 is a schematic diagram of a local configuration of a second digital system; FIG. 9A shows an exploded perspective view of a second digital system; FIG. 9B shows a diagram of components inside a second digital system being combined together; and FIG. 10 shows an overall configuration diagram of a second digital system. Hereinafter, the second digital system 123 is described in detail with reference to FIGS. 8-10.

As shown in FIG. 8, the second digital system 123 may comprise a control portion 1231, a gas sensor 1232, an environmental sensor 1233, a dust sensor 1234, an adapter 1235, a wireless communication portion 1236, a processor 1237, and a display portion 1238.

The control portion 1231 has a front face and a back face, and a plurality of serial hardware interfaces are provided on the back face of the control portion 1231.

The gas sensor 1232 is in communication connection with the control portion 1231 via the serial interfaces on the back face of the control portion 1231, and is configured to sense the contents of predetermined gases in the interior space of the device 10 to obtain gas content data and transmit the obtained gas content data to the control portion 1231 via the serial interfaces. For example, when the live animal is a horse, the predetermined gases sensed by the gas sensor 1232 may be carbon dioxide, carbon monoxide, ammonia, methane, or the like. The gas sensor 1232 may be an MEMS (Micro-Electro-Mechanical System) gas sensor.

The environmental sensor 1233 is in communication connection with the control portion 1231 via the serial interfaces on the back face of the control portion 1231, and is configured to sense environmental data in the interior space of the device 10 and transmit the environmental data to the control portion 1231 via the serial interfaces. Here, the environmental data in the interior space comprises temperature, humidity, air pressure, and the like in the interior space. The environmental sensor 1232 may be a Fermi multifunctional environmental sensor.

Dust in the interior space of the device 10 is also an important factor affecting the respiratory health of the live animal. The dust sensor 1234 is in communicative connection with the control portion 1231 via the serial interfaces on the back face of the control portion 1231, and is configured to sense the concentration of dust in the interior space of the device 10 to obtain dust concentration data and transmit the dust concentration data to the control portion 1231 via the serial interfaces. The dust sensor 1234 may be a Sharp optical dust sensor with a model no. GP2Y1010AU0F. Alternatively, the dust sensor 1234 may be connected to the serial interfaces on the back face of the control portion 1231 via the adapter 1235, so as to transmit the sensed dust concentration data to the control portion 1231.

According to the embodiments of the present disclosure, the first data may comprise the described gas content data, environmental data, dust concentration data, etc.

The wireless communication portion 1236 is provided on the back face of the control portion 1231. The control portion 1231 receives the physiological characteristic data, the identity identification information and the position data of the live animal from the first digital system 121 via the wireless communication portion 1236. The wireless communication portion 1236 may transmit data processed by a processor described below to the outside. The wireless communication portion 1236 may be Wi-Fi or Bluetooth, but the present disclosure is not limited thereto; and any communication element capable of performing wireless communication can be used as the wireless communication portion of the present disclosure.

The processor 1237 is provided on the back face of the control portion 1231. The processor 1237 comprises a GPU chip, wherein the GPU chip can provide a high-performance computing capability, process multi-modal data comprising the gas content data, environmental data, dust concentration data and physiological characteristic data which are received in real time, and can transmit the processed multi-modal data to a deep learning-based prediction model for predicting the health state and risk of illness of the live animal. The prediction model herein has been trained to have the capability for diagnosing a shipping fever disease.

The display portion 1238 is provided on the front face of the control portion 1231. The display portion 1238 has a visual interface, and the visual interface presents the processed multi-modal data and risk of illness information of the live animal, etc. in a visual image model manner, and supports screen-based touch interaction of a user for the user to select and view desired data. For example, the screen of the display portion 1238 may be a touch screen.

Figure 11:
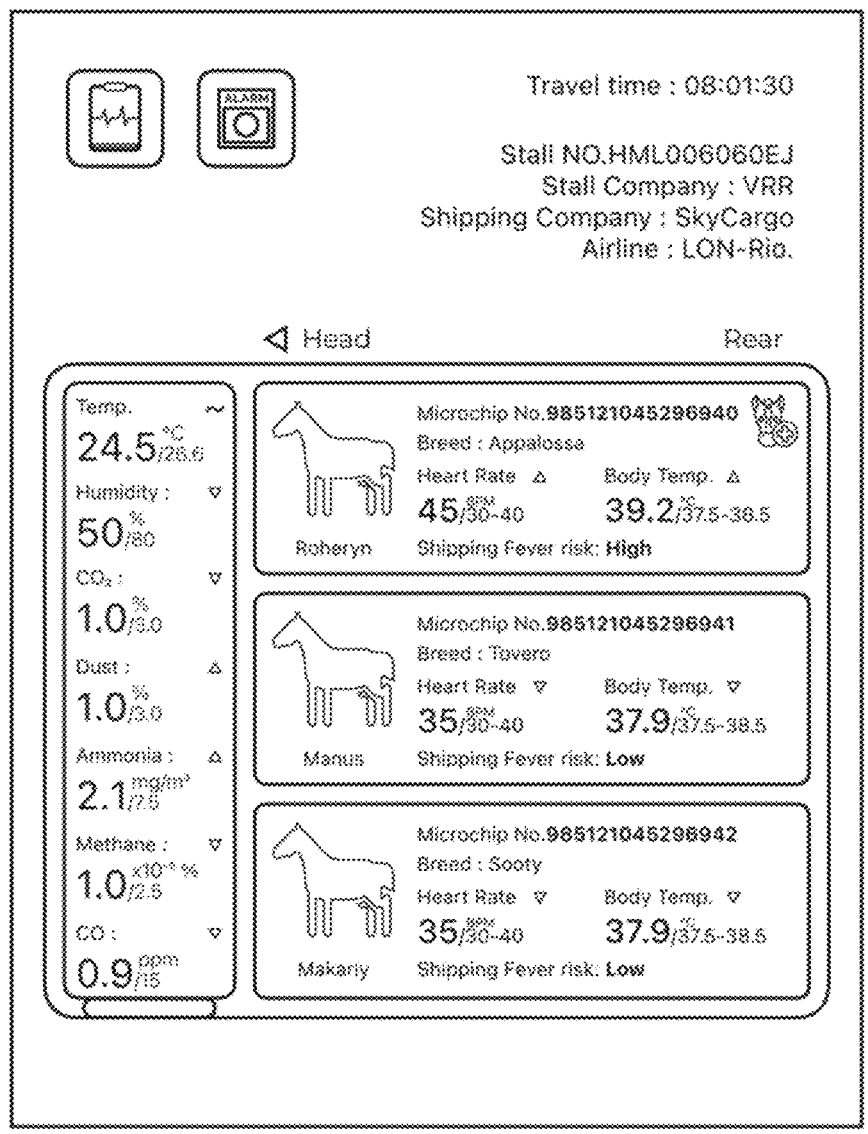
FIG. 11 shows a specific example of a visual interface of a display portion.

FIG. 11 shows a specific example of a visual interface of a display portion. For example, when the live animal is a horse, the visual interface of the display portion 1238 visually displays various information related to the horse.

The upper portion of FIG. 11 shows basic flight information of the transported horse, for example, regarding the transported horse, the Travel time is 08:01:30, the Stall No. is HML006060EJ, the Shipping Company is SkyCargo, and the Airline is LON-Rio.

The left side of FIG. 11 shows that in the current stall, the temperature (Temp.) is 24.5° C., the Humidity is 50%, the content of CO2 is 1.0%, the content of Dust is 1.0%, the concentration of Ammonia is 2.1 mg/m3, the content of Methane is $1.0 \times 10-5$% and the content of CO is 0.9 ppm.

The right side of FIG. 11 shows identity identification information, physiological characteristic data and risk of illness prompt of three horses. In particular, for a horse named Rohergy, the Microchip No. is 985121045296940, the Breed thereof is Appalossa, the heart rate thereof is 45 BPM, the body temperature thereof is 39.2° C., and the prompt of Shipping Fever risk is high. For a horse named Manus, the Microchip No. thereof is 985121045296941, the Breed thereof is Tovero, the heart rate thereof is 35 BPM, the body temperature thereof is 37.9° C., and the prompt of Shipping Fever risk is low. For a horse named Makariy, the Microchip No. thereof is 985121045296942, the Breed thereof is Sooty, the heart rate thereof is 35 BPM, the body temperature thereof is 37.9° C., and the prompt of Shipping Fever risk is low.

By the visual interface of the display portion, the live animal caretaker can intuitively learn various data information and risk of illness prompt information of the live animal, facilitating the live animal caretaker to timely take corresponding intervention measures of adjuvant therapy and rehabilitation regarding different situations; and thus, the live animal can obtain more effective care, the occurrence rate of shipping fever disease is reduced, and the safety of the live animal during transportation is improved, ensuring that different degrees of damage such as stress, physiological functional impairment, shipping fever disease and even death, etc. will not occur due to delays in the optimal opportunity for treatment caused by lack of information.

As shown in FIGS. 8 and 9A, the second digital system 123 may further comprise a mobile battery 1239, a vacuum pump 1240, a support portion 1241, and a housing which has a first housing 1242 and a second housing 1243.

The mobile battery 1239 supplies power to the control portion 1231, the gas sensor 1232, the environmental sensor 1233, the dust sensor 1234, the wireless communication portion 1236, the processor 1237, the display portion 1238 and the vacuum pump 1240.

The vacuum pump 1240 is configured to enable air within the housing to communication with air in the interior space outside the housing. Air is circulated by the vacuum pump 1240, so that the air inside the housing is consistent with the air in the interior space outside the housing as much as possible, and thus, air parameters measured inside the housing can reflect the air condition inside the interior space outside the housing as accurately as possible, thereby improving the accuracy of data sensed by the sensors in the second digital system.

The support portion 1241 is configured to support the control portion 1231, the gas sensor 1232, the environmental sensor 1233, the dust sensor 1234, the wireless communication portion 1236, the processor 1237, the display portion 1238, the mobile battery 1239 and the vacuum pump 1240.

A left side view of FIG. 9B illustrates specific positional relationships of various components when the control portion 1231 and the display portion 1238 are not mounted and when the gas sensor 1232, the environmental sensor 1233, the dust sensor 1234, the wireless communication portion 1236, the processor 1237, the mobile battery 1239 and the vacuum pump 1240 are supported in the support portion 1241; and a right side view of FIG. 9B further illustrates specific positional relationships of various components when the control portion 1231 and the display portion 1238 are mounted and when the control portion 1231, the gas sensor 1232, the environmental sensor 1233, the dust sensor 1234, the wireless communication portion 1236, the processor 1237, the display portion 1238, the mobile battery 1239 and the vacuum pump 1240 are supported in the support portion 1241.

As shown in FIG. 9A, the first housing 1242 is provided with a plurality of air holes H penetrating through the first housing 1242 in a predetermined area, and the first housing 1242 accommodates the support portion 1241 from one side of the support portion 1241 (i.e., the back face of the support portion in FIG. 9A). The second housing 1243 is arranged opposite the first housing 1242, and has a housing opening O1 of the same size as the display portion 1238. The second housing 1243 accommodates the support portion 1241 from the other side of the support portion 1241 (i.e., the front face of the support portion in FIG. 9A), and when the support portion 1241 is accommodated in the housing, the display portion 1238 is embedded in the housing opening O1. The arrangement of the air holes H further ensures the circulation of air inside the housing and the air in the interior space outside the housing, thereby improving the accuracy of the sensing data of the sensors in the second digital system.

FIG. 10 shows an overall configuration diagram of a second digital system obtained after assembling the various components of the second digital system 123 in FIG. 9A in an integrated manner. A pair of clamping portions 1245 may be further provided on the outer surface of the second housing 1243 of the second digital system 123, and the second digital system may be integrally clamped at a desired position through the pair of clamping portions 1245.

Returning to FIG. 1, a door opening O2 may be further provided on the door 117 of the device 10 for live animal transport. The second digital system 123 may be integrally embedded in the door opening O2, such that the display portion 1238 is provided towards the outside of the door through the door opening O2.

Figure 12:
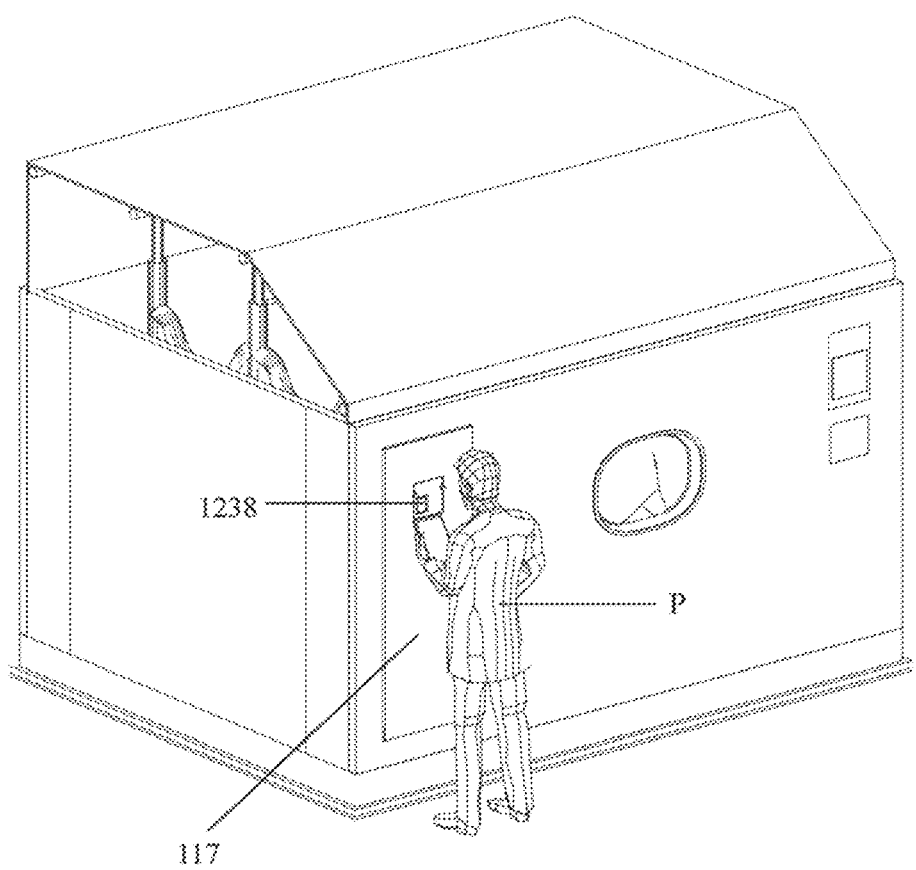
FIG. 12 shows a diagram in which a live animal caretaker views data through a display portion of a second digital system provided on a door.

FIG. 12 shows a diagram in which the live animal caretaker views data through the display portion of the second digital system provided on the door.

As shown in FIG. 12, the live animal caretaker P can touch the screen of the display portion 1238 with a finger, to select and view the physiological characteristic data of the live animal, the environmental condition data in the device, the predicted health state data of the live animal, the predicted risk of illness information of the live animal, etc. which are acquired by the first digital system and the second digital system. By viewing the information through the display portion 1238, the live animal caretaker can easily learn the health condition and living environment condition of the live animal, and different measures are taken for different situations, to ensure the health and comfort of the live animal.

In addition, in the device for live animal transport according to the embodiments of the present disclosure, various data acquired from the first digital system and the second digital system can be stored in the second digital system or uploaded to the cloud, thus not only can these data be analyzed online, but also they can be analyzed offline. With regard to the death of a live animal during mass transportation, causes and liabilities can be found by such online analysis or offline analysis, thereby avoiding the occurrence of similar death events.

Returning to FIGS. 1 and 5, on the first side plate 1091 of the device 10 for live animal transport, a transportation material file storage portion 10911 may be further provided for placing transportation-related materials, so as to facilitate lookup by the live animal caretaker. The transportation material file storage portion 10911 may be a folder, a file bag, or a file box.

According to the embodiments of the present disclosure, the device for live animal transport is described by taking a horse as an example of a live animal, but the present disclosure is not limited thereto, and the device for live animal transport according to the embodiments of the present disclosure can also be used for transport of large or small animals such as cattle, sheep, etc.

According to the device for live animal transport of the present disclosure, the contour of the top portion of the device can be adjusted by a plurality of telescopic pillars, so as to adapt to different cargo hold positions, thereby reducing the transportation costs of live animals. The device for live animal transport according to the present disclosure also can guide and absorb liquid excreted from live animals, thereby preventing the liquid from damaging the health of the live animals. The device for live animal transport according to the present disclosure can also monitor, in real time, individual physiological characteristic data of the live animal and the environmental condition in the device, so that the live animal caretaker can learn the data information in time, and take corresponding measures according to these information, thereby improving the comfort of the live animals and ensuring their health. By analyzing the data information, the cause and liability of death/illness of the live animal can be easily found during mass transportation.

In the embodiments of the present disclosure, the description of each aspect has its own emphasis. For the part not detailed in a certain aspect, please refer to the relevant description in other aspects.

The content above only relates to preferred embodiments of the present disclosure. It should be noted that for a person of ordinary skill in the art, several improvements and modifications can also be made without departing from the principle of the present disclosure, and these improvements and modifications shall also be considered as within the scope of protection of the present disclosure.

What is claimed is:
1. A device for live animal transport, comprising:
   a bottom plate, comprising a liquid guide plate and a non-liquid guide plate, wherein the liquid guide plate has a first end and a second end opposite the first end, and the non-liquid guide plate extends transversely at the first end of the liquid guide plates in a direction perpendicular to the liquid guide plate and is spaced apart from the liquid guide plate;
a plurality of support members, symmetrically provided at predetermined intervals on the bottom plate at the first end of the liquid guide plate and on the bottom plate at the second end of the liquid guide plate, and extending in a first direction perpendicular to the bottom plate;
a plurality of pillars, one end of each pillar being nested in a corresponding one of the support members, and the plurality of pillars being configured to be capable of telescoping in the first direction;
a plurality of beams, extending in a second direction from the first end of the liquid guide plate to the second end of the liquid guide plate, each beam being supported by an other end of the pillar at the first end of the liquid guide plate and the other end of the pillar at the second end of the liquid guide plate;
side plates, provided on the bottom plate and extending in the first direction around edges of the bottom plate; and
a top portion, supported by the plurality of beams to cover an interior space formed by the bottom plate and the side plates, wherein the interior space is used to accommodate the live animal, and
wherein the plurality of pillars are configured to telescope in the first direction so as to adjust a contour of the top portion.

2. The device for live animal transport according to claim 1, wherein the liquid guide plate comprises a plurality of liquid guide members and a plurality of liquid absorption members, wherein the plurality of liquid guide members are arranged side by side along the second direction, each liquid absorption member is provided at the end of each liquid guide member at the second end of the liquid guide plate, the plurality of liquid guide members are configured to guide liquid excreted from the live animal, and the plurality of liquid absorption members are configured to absorb the liquid guided by the corresponding liquid guide members.

3. The device for live animal transport according to claim 1, wherein the bottom plate further comprises a base, provided with recesses, wherein the liquid guide plate and the non-liquid guide plate can be snap-fitted in the recesses.

4. The device for live animal transport according to claim 1, wherein the bottom plate has:
a first side;
a second side, opposite the first side;
a third side, adjacent to the first side; and
a fourth side, opposite the third side,
and the side plates comprise:
a first side plate, provided on the first side of the bottom plate;
a second side plate, provided on the second side of the bottom plate;
a third side plate, provided on the third side of the bottom plate; and
a fourth side plate, provided on the fourth side of the bottom plate,
wherein the device for live animal transport further comprises:
a first inspection window, provided at a middle portion of the first side plate;
a second inspection window, provided at a middle portion of the second side plate; and
a door, provided at the end of the first side plate adjacent to the fourth side plate,
wherein a caretaker of the live animal touches and inspects the live animal accommodated in the interior space through the first inspection window and/or the second inspection window, and the caretaker of the live animal can enter the interior space through the door.

5. The device for live animal transport according to claim 3, further comprising a first digital system, configured to acquire physiological characteristic data of the live animal and send the acquired physiological characteristic data to the outside by a wireless transmission manner.

6. The device for live animal transport according to claim 5, wherein the first digital system comprises:
a pulse sensor, configured to sense the pulse of the live animal to obtain pulse data of the live animal;
a respiratory rate sensor, configured to sense the respiratory rate of the live animal to obtain respiratory rate data of the live animal;
a temperature sensor, configured to sense the body temperature of the live animal to obtain temperature data of the live animal;
a GPS sensor, configured to position the position of the live animal to obtain position data of the live animal;
an RFID tag, configured to record identity identification information of the live animal; and
a solar cell, configured to supply power to the pulse sensor, the respiratory rate sensor, the temperature sensor and the GPS sensor,
wherein the physiological characteristic data comprises the pulse data, the respiratory rate data and the temperature data, and
the physiological characteristic data, the identity identification information and the position data of the live animal are sent to the outside in a correlated manner by a wireless transmission manner.

7. The device for live animal transport according to claim 6, wherein the first digital system is integrated in straps or belts worn on the body of the live animal.

8. The device for live animal transport according to claim 6, further comprising:
a second digital system, configured to:
sense first data characterizing environmental conditions in the interior space;
receive the physiological characteristic data, the identity identification information and the position data of the live animal from the first digital system;
analyze the first data and the physiological characteristic data, to obtain an analysis result; and
display the analysis result.

9. The device for live animal transport according to claim 8, wherein the second digital system comprises:
a control portion, having a front face and a back face, a plurality of serial interfaces being provided on the back face;
a gas sensor, in communication connection with the control portion via the serial interfaces, and configured to sense the contents of predetermined gases in the interior space to obtain gas content data and to transmit the gas content data to the control portion via the serial interfaces;
an environmental sensor, in communication connection with the control portion via the serial interfaces, and configured to sense environmental data in the interior space and to transmit the environmental data to the control portion via the serial interfaces;
a dust sensor, in communication connection with the control portion via the serial interfaces, and configured to sense the concentration of dust in the interior space to obtain dust concentration data and to transmit the dust concentration data to the control portion via the serial interfaces;

a wireless communication portion, provided on the back face of the control portion, the control portion receiving the physiological characteristic data, the identity identification information and the position data of the live animal from the first digital system via the wireless communication portion;

a processor, provided on the back face of the control portion, the processor comprising a GPU chip, wherein the GPU chip can process multi-modal data comprising the gas content data, the environmental data, the dust concentration data and the physiological characteristic data which are received in real time, and can predict the health state and the risk of illness of the live animal by a prediction model according to the processed multi-modal data; and a display portion, provided on the front face of the control portion, wherein the display portion has a visual interface, the visual interface visually presents the processed multi-modal data and the risk of illness information of the live animal, and supports screen-based touch interaction of a user for the user to select and view desired data, wherein the first data comprises the gas content data, the environmental data and the dust concentration data.

10. The device for live animal transport according to claim 9, wherein the second digital system further comprises:

a support portion, configured to support the control portion, the gas sensor, the environmental sensor, the dust sensor, the wireless communication portion, the processor, and the display portion; and a housing, configured to accommodate the support portion, wherein the housing comprises:

a first housing, provided with a plurality of air holes penetrating through the first housing in a predetermined area, the first housing accommodating the support portion from one side of the support portion; and a second housing, arranged opposite the first housing and having a housing opening of the same size as the display portion, wherein the second housing accommodates the support portion from the other side of the support portion opposite the one side, and when the support portion is accommodated in the housing, the display portion is embedded in the housing opening.

11. The device for live animal transport according to claim 10, wherein the second digital system further comprises:

a vacuum pump, provided in the housing and supported by the support portion, the vacuum pump being configured to enable air inside the housing to communicate with air in the interior space outside the housing.

12. The device for live animal transport according to claim 11, wherein the door is provided with a door opening, and the second digital system can be embedded in the door opening, so that the display portion is provided toward the outside of the door via the door opening.

13. The device for live animal transport according to claim 2, further comprising live animal partition plates, provided in the interior space and configured to partition, according to the number of the plurality of liquid guide members, the interior space into a plurality of predetermined spaces corresponding to said number, each predetermined space being capable of accommodating one live animal, wherein in each predetermined space, one liquid guide member and one liquid absorption member are provided.

* * * * *